United States Patent
Obert

(10) Patent No.: US 7,433,935 B1
(45) Date of Patent: Oct. 7, 2008

(54) SELF-ADAPTING PLUG-IN SERVICE

(75) Inventor: James E. Obert, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 78 days.

(21) Appl. No.: 11/118,244

(22) Filed: Apr. 29, 2005

(51) Int. Cl.
*G06F 13/00* (2006.01)

(52) U.S. Cl. ............... 709/219; 709/246; 719/321; 719/328

(58) Field of Classification Search ........... 709/219, 709/246, 217; 719/321, 328, 331
See application file for complete search history.

(56) References Cited

U.S. PATENT DOCUMENTS

| | | | | |
|---|---|---|---|---|
| 5,903,728 A | * | 5/1999 | Semenzato | 709/217 |
| 6,212,535 B1 | * | 4/2001 | Weikart et al. | 715/513 |
| 7,062,646 B2 | * | 6/2006 | Sabramanian et al. | 713/1 |
| 7,069,562 B2 | * | 6/2006 | Kushnirskiy et al. | 719/328 |
| 2002/0180798 A1 | * | 12/2002 | Poor et al. | 345/781 |
| 2003/0079052 A1 | * | 4/2003 | Kushnirskiy | 709/328 |
| 2006/0129972 A1 | * | 6/2006 | Tyburski et al. | 717/106 |

\* cited by examiner

*Primary Examiner*—Viet Vu

(57) ABSTRACT

A self-adapting plug-in service that runs on a plurality of platforms and obviates the need to develop a different version of the plug-in service for each platform. A self-adapting plug-in service according to the present techniques includes code that generates a platform access using a common plug-in API and a translation layer that translates the platform access into a platform-specific access that is adapted one of the platforms that is running under the self-adapting plug-in service.

18 Claims, 4 Drawing Sheets

SELF-ADAPTING PLUG-IN SERVICE

BACKGROUND

A variety of platforms may include support for plug-in services. A plug-in service may be used to augment the capabilities of a platform by adding services that are not built-in to the platform. For example, a plug-in service may be downloaded via the Internet to provide a new capability to an existing platform.

One example of a platform that supports plug-in services is a services platform. A services platform may be defined as a software system that provides a set of services that pertain to a set of devices deployed in a home or business. Examples of devices that may be serviced via a services platform include computer systems, printers, communication devices, storage devices, display devices, etc. Examples of a services platform include Openview and WebjetAdmin by Hewlett-Packard.

A platform may conform to an interface specification that enables software developers to create plug-in services that are able to run on the platform. For example, an interface specification may include an application programming interface (API) that defines a set of methods in the platform that may be called by plug-in services.

A prior plug-in service that is adapted to the interface specification for one platform may not run on another platform due to differences in the interface specifications of the two platforms. For example, a prior plug-in service developed according to the interface specification of Openview may not run on WebJetAdmin. As a consequence, a developer of a plug-in service may develop a version of the plug-in service for each desired platform. Unfortunately, the development of multiple versions of the same plug-in service may increase the cost of developing a plug-in service by consuming large amounts of software development resources and by increasing development time an increasing the likelihood of software bugs.

SUMMARY OF THE INVENTION

A self-adapting plug-in service is disclosed that runs on a plurality of platforms and obviates the need to develop a different version of the plug-in service for each platform. A self-adapting plug-in service according to the present techniques includes code that generates a platform access using a common plug-in API and a translation layer that translates the platform access into a platform-specific access that is adapted one of the platforms that is running under the self-adapting plug-in service.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
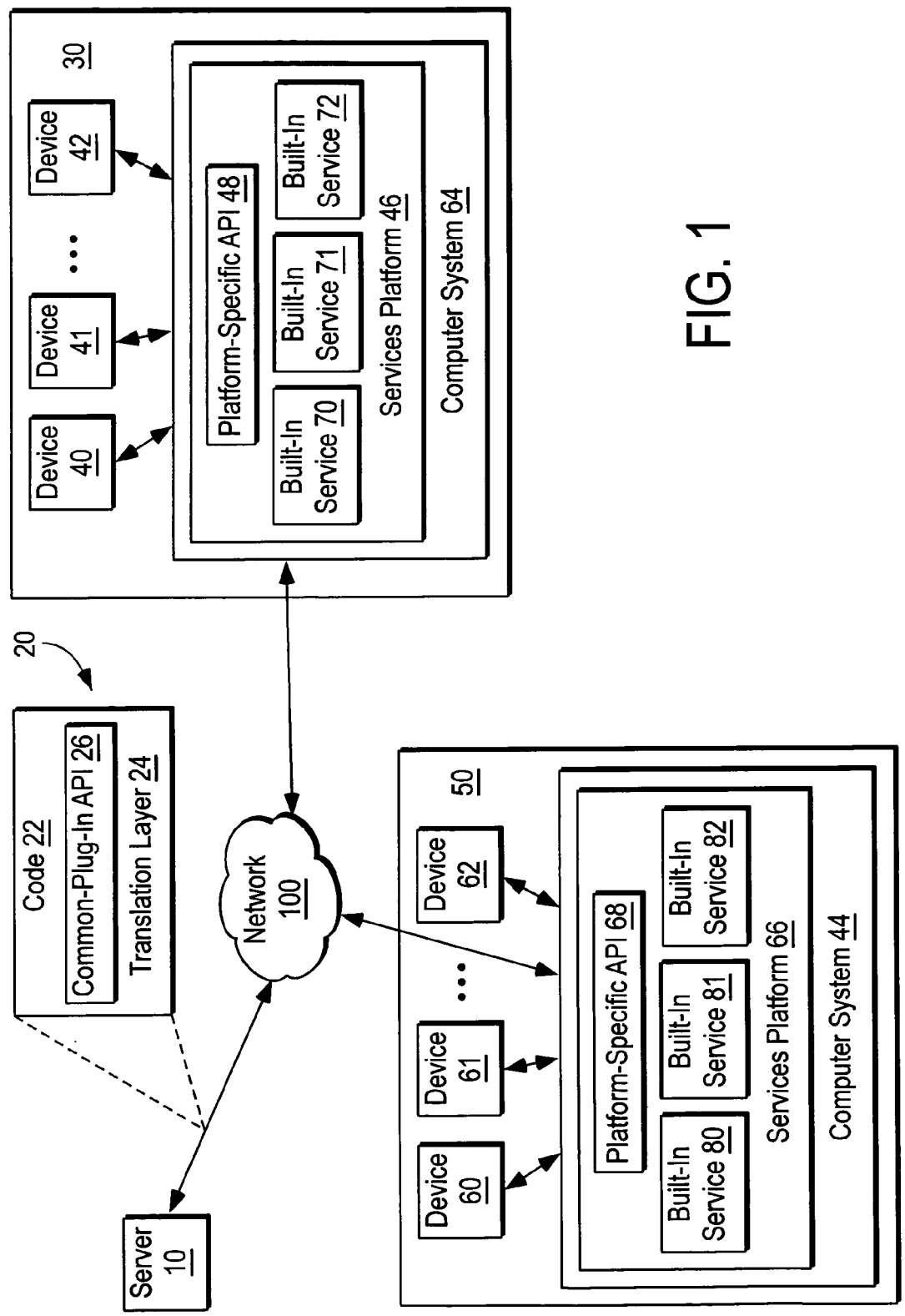
FIG. 1 shows a self-adapting plug-in service that may be run under a variety of different platforms.

FIG. 1 shows a self-adapting plug-in service 20 that may be run on a variety of different platforms. The self-adapting plug-in service 20 includes a set of code 22 that generates platform accesses using a common plug-in API 26. The self-adapting plug-in service 20 further includes a translation layer 24 that translates the platform accesses generated by the code 22 into platform-specific accesses that are adapted the platform that runs under the self-adapting plug-in service 20. The common plug-in API 26 enables the code 22 to be written to one API, the common plug-in API 26, and run on multiple different platforms having their own platform-specific APIs.

In the example embodiment shown, the self-adapting plug-in service 20 may be run on a services platform 46 in a customer site 30 and a services platform 66 in a customer site 50. The code 22 of the self-adapting plug-in service 20 generates platform accesses using the common plug-in API 26 and the translation layer 24 translates the platform accesses into platform-specific accesses that are adapted either the services platform 46 or the services platform 66 depending upon where the self-adapting service 20 is running.

The self-adapting plug-in service 20 may be downloaded from a server 10 to the customer site 30 and/or to the customer site 50 via a network 100, e.g. the Internet. Alternatively, the self-adapting plug-in service 20 may be installed at the customer site 30 and/or at the customer site 50 using a storage media, e.g. optical disc, magnetic media, etc.

The services platform 46 runs on a computer system 44 at the customer site 30 and provides a set of built-in services 70-72 that pertain to a set of devices 40-42 that are deployed in the customer site 30. The services platform 46 includes a platform-specific application programming interface (API) 48 that enables plug-in services to access the built-in services 70-72.

The services platform 66 runs on a computer system 64 at the customer site 50 and provides a set of built-in services 80-82 that pertain to a set of devices 60-62 that are deployed in the customer site 50. The services platform 66 includes a platform-specific API 68 that enables plug-in services to access the built-in services 80-82.

The services platforms 46 and 66 are different services platforms that provide different platform-specific APIs for plug-in services. For example, the services platform 46 may be Openview and the services platform 66 may be WebJetAdmin.

The translation layer 24 is code that translates between the common plug-in API 26 and the platform-specific APIs 48 and 68. A platform access generated by the code 22 may be a call to a built-in service of a services platform defined in the common plug-in API 26. In response to the call, the translation layer 24 determines which of the services platforms 46 or 66 is running under the self-adapting plug-in service 20 and then translates the call accordingly. For example, if the self-adapting plug-in service 20 is installed on the services platform 46 then the translation layer 24 translates the call defined in the common plug-in API 26 into an equivalent call defined in the platform-specific API 48 of the services platform 46. Similarly, if the self-adapting plug-in service 20 is installed on the services platform 66 then the translation layer 24 translates between the common plug-in API 26 and the platform-specific API 68 of the services platform 66.

The translation layer 24 may translate a platform access from the code 22 by performing a platform-specific access using a set of semantic rules that correspond to the services platform that is running under the self-adapting plug-in service 20. For example, if the self-adapting plug-in service 20 is installed on the services platform 46 then the translation layer 24 may translate a platform access from the code 22 by performing a platform-specific access using a set of semantic rules associated with the services platform 46, e.g. Openview or WebJetAdmin semantic rules that pertain to a particular built-in service.

In an example embodiment in which the services platform 46 is Openview and the services platform 66 is WebJetAdmin, the built-in services 70-72 include and Openview device discovery service, an Openview remote access service, and an Openview remote transport service and the built-in services 80-82 include a WebjetAdmin device discovery service, a WebJetAdmin remote access service, and a WebJetAdmin remote transport service.

The common plug-in API 26 provides a calling interface to a set of methods in the translation layer 24 that correspond to the common built-in services of an underlying services platform, i.e. the device discovery service, and the remote access service, and the remote transport service of the above example services platforms 46 and 66. An example calling interface of the common plug-in API 26 is as follows.

DiscoverDevice(device-data)
RemoteAccess(remoteaccess-data)
RemoteTransport (remotetransport-data)

The argument device_data is a data structure enables a call from the code 22 to pass data, parameters, commands, etc. to the DiscoverDevice method of the translation layer 24. The device_data data structure includes a set of data, parameters, commands, etc., that enables the translation layer 24 to construct a call to any of the underlying services platforms onto which the self-adapting plug-in service 20 may be installed. For example, the device_data data structure includes a set of data, parameters, commands, etc., that enables the translation layer 24 to construct a call to Openview device discovery service and to construct a call to the WebjetAdmin device discovery service.

Similarly, the argument remoteaccess_data is a data structure enables a call from the code 22 to pass data, parameters, commands, etc. to the RemoteAccess method of the translation layer 24 and the argument remotetransport_data is a data structure enables a call from the code 22 to pass data, parameters, commands, etc. to the RemoteTransport method of the translation layer 24. The remoteaccess_data and RemoteTransport data structures include data, parameters, commands, etc., that enables the translation layer 24 to construct a corresponding call to any of the underlying services platforms onto which the self-adapting plug-in service 20 may be installed.

Figure 2:
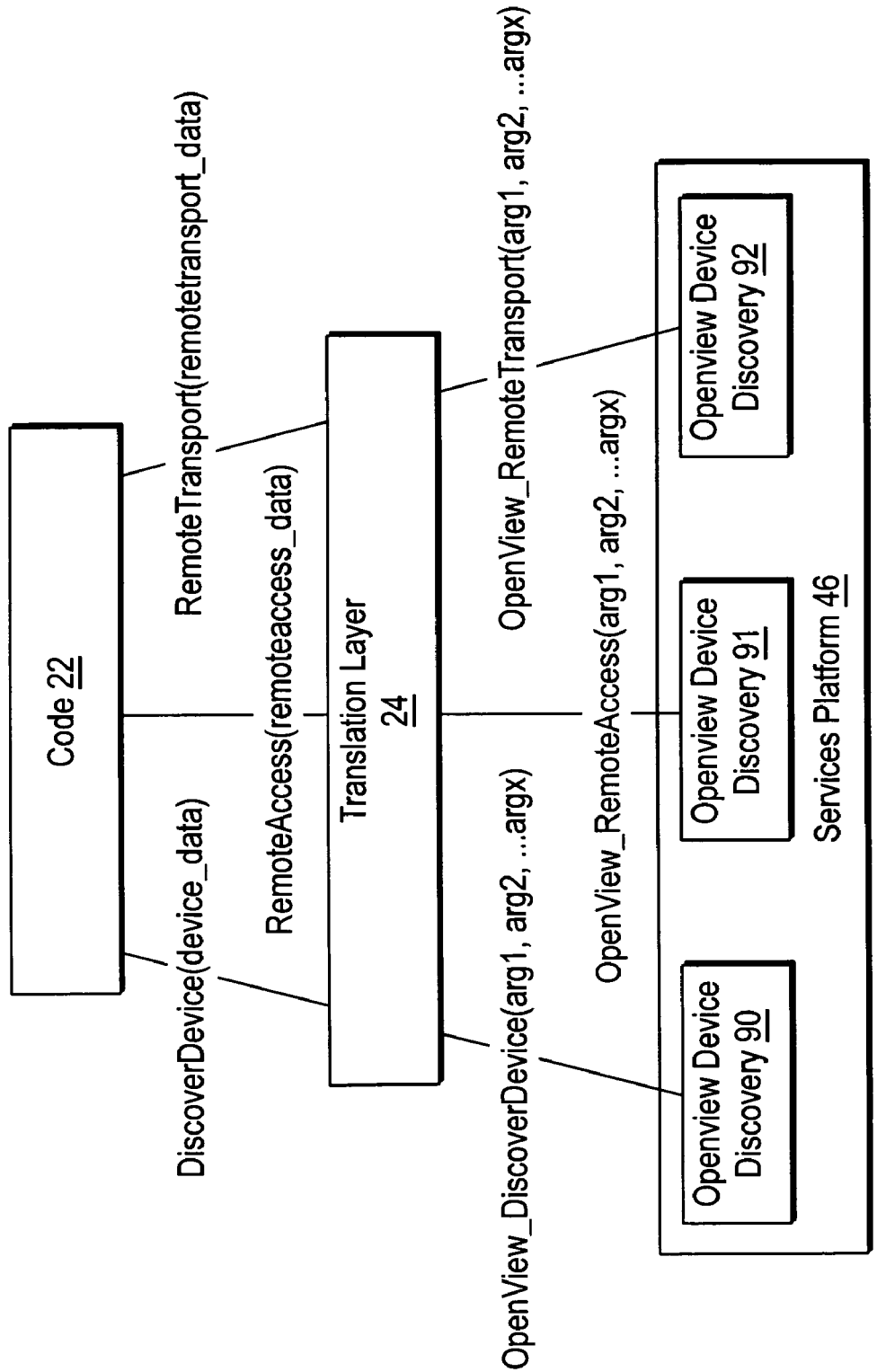
FIG. 2 shows an example of a self-adapting plug-in service running on a services platform according to the present teachings.

FIG. 2 shows an example of the self-adapting plug-in service 20 running on the services platform 46. The built-in services 70-72 of the services platform 46 for an embodiment in which the services platform 46 is Openview include an Openview device discovery service 90, an Openview remote access service 91, and an Openview remote transport service 92 according to the platform-specific API 48.

As shown, the code 22 generates a call DiscoverDevice (device-data) to the translation layer 24 using the common plug-in API 26. The translation layer 24 translates the call DiscoverDevice(device-data) into a call Openview_DiscoverDevice(arg1, arg2,..argx) to the Openview device discovery service 90 using the platform-specific API 48. The translation layer 24 constructs the Openview-DiscoverDevice(arg1, arg2, . . . argx) call by determining that the self-adapting plug-in service 20 is running on Openview and extracting the arguments arg1, arg2, . . . argx from the device-_data data structure according to the Openview platform-specific API 48. Similarly, the code 22 generates a call RemoteAccess(remoteaccess_data) to the translation layer 24 using the common plug-in API 26 and the translation layer 24 translates it into a call Openview RemoteAccess(arg1, arg2, . . . argx) to the Openview remote access service 91 using the platform-specific API 48 and the code 22 generates a call RemoteTransport(remotetransport-data) to the translation layer 24 using the common plug-in API 26 and the translation layer 24 translates it into a call Openview_RemoteTransport(arg1, arg2, . . . argx) to the Openview remote transport service 92 using the platform-specific API 48.

Figure 3:
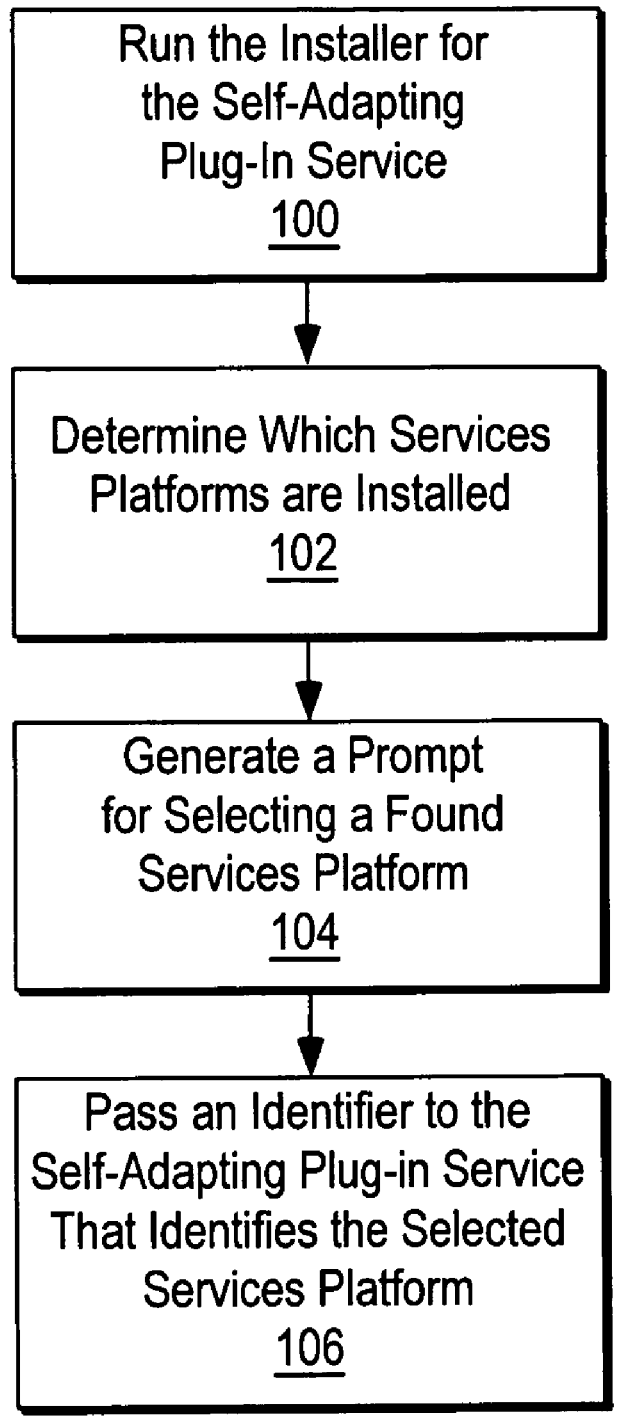
FIG. 3 shows a method for determining which platform is running under a self-adapting plug-in service according to the present teachings.

FIG. 3 shows a method for determining which platform, e.g. Openview or WebJetAdmin, is running under the self-adapting plug-in service 20. In this example, the self-adapting plug-in service 20 has been downloaded to the computer system 44 in the customer site 30. The download package from the server 10 that includes the self-adapting plug-in service 20 also includes an installer program for the self-adapting plug-in service 20. The installer program is adapted to install programs under the operating system of the computer system 44.

At step 100, the installer program for the self-adapting plug-in service 20 is run on the computer system 44. The installer program may run automatically after download or may instigated by a user.

At step 102, the installer program determines which services platforms are installed on the computer system 44. The installer program may detect a services platform by finding files associated with the services platform in a directory of the computer system 44. For example, the installer program may find Openview and/or WebjetAdmin files in a directory of the computer system 44. Alternatively, the installer program may detect a services platform by examining a registry of the operating system of the computer system 44. For example, a registry may indicate that Openview and/or WebJetAdmin is installed on the computer system 44.

At step 104, the installer program generates a prompt for installing the self-adapting plug-in service 20 onto one of the detected services platform. For example, if more than one services platform was detected at step 102 then at step 104 a prompt is generated that enables selection of one of them, e.g. either Openview or WebjetAdmin, for the installation. If only one services platform was detected at step 102 then at step 104 a prompt may be generated that enables verification of the self-adapting plug-in service 20 installation. The prompt at step 104 may be answered by a user or may be automatically answered as part of the installation.

At step 106, the installer program passes an identifier to the self-adapting plug-in service 20 that identifies which services platform was selected at step 104. The translation layer 24 of the self-adapting plug-in service 20 uses the identifier when translating platform accesses to a services platform by the code 22.

Figure 4:
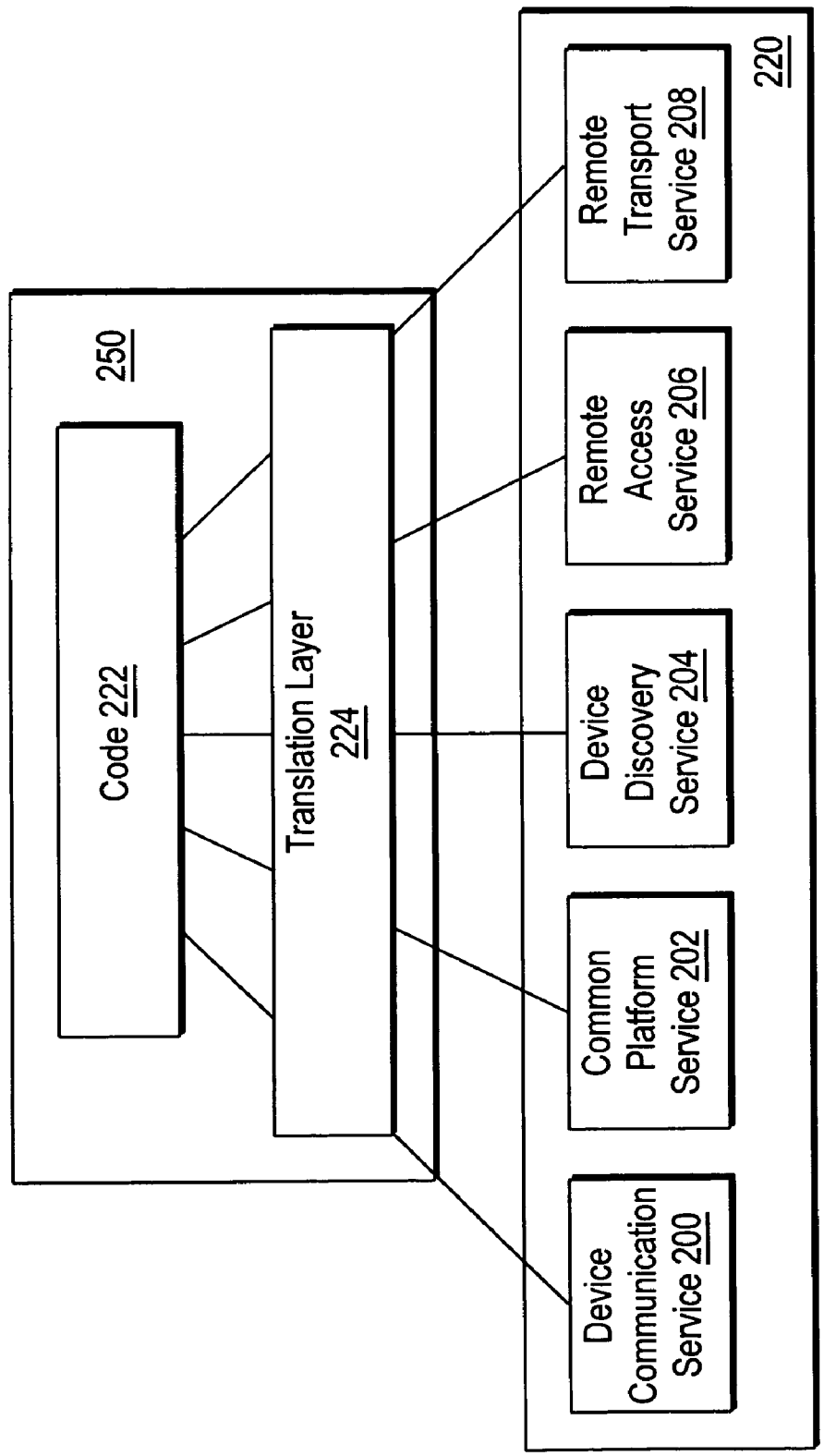
FIG. 4 shows a self-adapting plug-in service that accesses a set of built-in services of an example platform according to the present teachings.

FIG. 4 shows a self-adapting plug-in service 250 that accesses a set of built-in services 200-210 of an example services platform 220 via a translation layer 224 having a common plug-in API according to the present teachings.

The built-in service 200 is a device communication service that enables communication with devices at a customer site. The built-in service 200 provides server to device communications, data gathering and administration. In one embodiment, the built-in service 200 includes device simple network management protocol (SNMP), printer management language (PML) protocol, printer job language (PJL) protocol, and service location protocol (SLP).

The built-in service 202 is a common platform service, a user interface service, and a console management service. The common platform service can gather data reflecting what is displayed on a user interface of the services platform 220.

The built-in service 204 is a device discovery service. A set of device discovery methods are employed through the services platform 220 to locate devices on a network at a customer site of the services platform 220. The device discovery methods include multicasting service location protocol discovery, SNMP range ping discovery, ARP table discovery, and directed network broadcasting discovery.

The built-in service 206 is a remote access service. Remote access is provided from remote clients through the self-adapting plug-in service 250 and the services platform 220 for the purposes of command and control of servers at the remote site. These access techniques include VPN, secure shell, and HTTP data brokering.

The built-in service 208 is a remote transport service. Data is collected and transported by the self-adapting plug-in service 250 through the services platform 220. These remote transports include HTTP(S), SMTP, and secure SMTP.

Table 1 shows the common plug-in API presented to the self-adapting plug-in service 250 and the platform-specific API for the services platform 220 in the above example embodiment.

TABLE 1

| Service Description | Common Plug-in API (Translation Layer) | Platform-Specific API (WebJetAdmin) | Comments |
| --- | --- | --- | --- |
| Get an SNMP object. | snmpGet (host,snmpOID) return: snmpDataType | entSNMPGet (host,OID) return: objectData | snmpDataType is a structure containing elements for all standard snmp data types. objectData is also a structure holding all of the standard snmp datatypes. OID is the object identifier, and host the host IP address. |
| Get the next SNMP object in the MIB tree. | snmpGetNext (host,startingSNMPOID) return: snmpDataType | entSNMPGetNext (host,OID) return: objectData | snmpDataType is a structure containing elements for all standard snmp data types. |
| Get a block of SNMP data from the MIB tree. | snmpGetBlock (host,blockOID) return: Vector snmpDataType | entSNMPGetBlock (host,OID) return: dataArray | DataArray is an array holding all of the standard snmp data types. |
| Set an snmp object. | snmpSetObject (host,setOID, value) return: setStatus | entSNMPSet (host,OID,value) return: transReturn | |
| Set an snmp trap. | snmpSetTrap (host,setOID, value,client) return: setStatus | entSNMPSetTrap (host,OID, value,recipient) return: transReturn | The client or recipient is the receiver of the trap notification. |
| Get Printer | getDeviceConsoleGroup | entGetManagementConsoleData | The server returns the UI console |
| Group from management console. | (server, printerGroup) return: Vector deviceData | (host, consoleGroup) return: array consoleData | data in array format for a specific display group. |
| Discovering printers using device multicasting. | sendMulticastSLPRequest (groupID) return: Vector slpPacketData | entMulticastRequest (multicastID) return: array multicastGroup | Data coming back through the slpPacketData vector contains all of the data from the multicast attribute packet. |
| Discovering printers using a snmp range ping. | snmpRangePingRequest (startingIP, endingIP,idOIDS) return: Vector devices | entRangePingSearch (ip1,ip2, gatheringOIDS) return: array deviceIDS | |
| Discovering printers using ARP table inspection. | arpTableSearch (targetHost, arpOID) return: Vector devices | entArpTableSearch(host, snmpOID) return: array deviceParams | |
| Remote access through Virtual Private Network | vpnAccess (targetHost, vpnServer, tunnelingPort, certificate) return: connectionStatus | entGainVPNAccess (host, tunnelServer, port, certificate) return: status | |
| Remote Transport using HTTP or HTTPS. | httpTransport (client, httpPort, securitySwitch) return: Vector deviceData | entHttpTransport (recipient, port, securityLevel) return: array collectionData | The client is the IP address or DNS name of the remote receiving machine. |

One example a semantic rule pertaining a services platform is parsing of returned data. The data return structures for each of the elements may be somewhat different for each services platform. Thus, the self-adapting plug-in service 250 return data structures are formed to accommodate the various data elements of each services platform. Specific parsing rules for each services platform are then utilized as part of the common plug-in API.

Another example a semantic rule pertaining a services platform is processing time for actions which may vary depending upon the platform-specific API call. For example, transaction time-out rules are different for the snmpGetBlock() method on WebJetAdmin as compared to OpenView. Thus transactional logic, retries, etc., may different for each services platform and may specified in a translation layer.

Another example a semantic rule pertaining a services platform is the availability of API elements in each services platform. For example, a services platform may not support all of the common plug-in API elements. For example, getDeviceConsuleGroup() is not supported when the self-adapting plug-in service is hosted in OpenView, but is when hosted in WebJetAdmin. Thus a translation layer may be provided with information on the supported APIs for each services platform and adapts accordingly.

While the above description focuses on embodiments in which a self-adapting plug-in service runs on services platforms, the present techniques are applicable to plug-in services to any platforms that have a substantial commonality in built-in services. Once a translation layer to the common services of a set of platforms according to a common plug-in API then any plug-in service may be developed using that common plug-in API and may then run on any of the platforms in conjunction with the translation layer.

The present techniques may be applied to services residing on JetDirect network cards in Hewlett-Packard printers. JetDirect includes have a number of services available, e.g. SNMP agents, secure sransports such as https and secure shell, IPSec for data-link layer data encryption—which could be used along with remote access and remote transport of data, and device discovery capabilities in the form of multicasting.

The present techniques may be applied to printer drivers which include services such as printer discovery, graphics/text rendering, low level OS graphics APIs, and translating application data to printer languages such as PCL and Postscript The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A self-adapting plug-in service, comprising:
  code that generates a platform access using a common plug-in API;
  translation layer that enables the plug-in service to run on a plurality of platforms by determining which of the platforms is running under the self-adapting plug-in service and then translating the platform access into a platform-specific access for the platform that is running wherein the translation layer determines which of the platforms is running under the self-adapting plug-in service by obtaining an indicator from an installer program that installed the self-adapting plug-in service.

2. The self-adapting plug-in service of claim 1, wherein the installer program detects which of the platforms is running by examining a file system of the platform that is running.

3. The self-adapting plug-in service of claim 1, wherein the platform-specific access is defined in a platform-specific API corresponding to the platform that is running.

4. The self-adapting plug-in service of claim 3, wherein the platform access is a call specified in the common plug-in API and the translation layer translates the call into a call specified in the platform-specific API.

5. The self-adapting plug-in service of claim 4, wherein the call according to the common plug-in API specifies a data structure and the translation layer translates the call by extracting from the data structure a set of arguments for the call defined in the platform-specific API.

6. The self-adapting plug-in service of claim 1, wherein the translation layer translates the platform access using a set of semantic rules corresponding to the platform that is running.

7. A method for providing a self-adapting plug-in service, comprising providing the self-adapting plug-in service with a translation layer that enables the self-adapting plug-in service to run on a plurality of platforms by determining which of the platforms is running under the self-adapting plug-in service and then translating the platform access into a platform-specific access for the platform that is running wherein the translation layer determines which of the platforms is running under the self-adapting plug-in service by obtaining an indicator from an installer program that installed the self-adapting plug-in service.

8. The method of claim 7, wherein the installer program detects which of the platforms is running by examining a file system of the platform that is running.

9. The method of claim 7, further comprising defining the platform-specific access in a platform-specific API corresponding to the platform that is running.

10. The method of claim 9, wherein translating comprises translating the platform access into a call specified in the platform-specific API.

11. The method of claim 10, wherein translating further comprising extracting from a data structure specified in platform access a set of arguments for the call.

12. The method of claim 7, wherein translating comprises translating the platform access using a set of semantic rules corresponding to the platform that is running.

13. A computer-readable storage medium that contains code that when executed provides a self-adapting plug-in service by generating a platform access and determining which of the platforms is running under the self-adapting plug-in service and then translating the platform access into a platform-specific access for the platform that is running wherein determining which of the platforms is running comprises obtaining an indicator from an installer program that installed the self-adapting plug-in service.

14. The computer-readable storage medium of claim 13, wherein the installer program detects which of the platforms is running by examining a file system of the platform that is running.

15. The computer-readable storage medium of claim 13, wherein the platform-specific access is defined in a platform-specific API corresponding to the platform that is running.

16. The computer-readable storage medium of claim 15, wherein translating comprises translating the platform access into a call specified in the platform-specific API.

17. The computer-readable storage medium of claim 16, wherein translating further comprising extracting from a data structure specified in the platform access a set of arguments for the call.

18. The computer-readable storage medium of claim 13, wherein translating comprises translating the platform access using a set of semantic rules corresponding to the platform that is running.

* * * * *